(12) United States Patent
Wu et al.

(10) Patent No.: US 10,780,418 B2
(45) Date of Patent: Sep. 22, 2020

(54) ZERO-VALENT IRON PILLARED MONTMORILLONITE REPAIR MATERIAL, AND PREPARATION METHOD THEREFOR AND APPLICATION THEREOF

(71) Applicant: SOUTH CHINA UNIVERSITY OF TECHNOLOGY, Guangdong (CN)

(72) Inventors: Pingxiao Wu, Guangdong (CN); Shanshan Yang, Guangdong (CN); Nengwu Zhu, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 16/466,299

(22) PCT Filed: Nov. 23, 2017

(86) PCT No.: PCT/CN2017/112450
§ 371 (c)(1),
(2) Date: Jun. 4, 2019

(87) PCT Pub. No.: WO2018/166238
PCT Pub. Date: Sep. 20, 2018

(65) Prior Publication Data
US 2020/0061581 A1 Feb. 27, 2020

(30) Foreign Application Priority Data

Mar. 16, 2017 (CN) .......................... 2017 1 0155827

(51) Int. Cl.
*B01J 21/16* (2006.01)
*B01J 37/04* (2006.01)
(Continued)

(52) U.S. Cl.
CPC .............. *B01J 21/16* (2013.01); *B01J 37/04* (2013.01); *B01J 37/16* (2013.01); *C02F 1/725* (2013.01); *C02F 2101/36* (2013.01)

(58) Field of Classification Search
None
See application file for complete search history.

(56) References Cited

FOREIGN PATENT DOCUMENTS

| CN | 102923835 | 2/2013 |
| CN | 102923835 A * | 2/2013 |

(Continued)

OTHER PUBLICATIONS

CN-102923835-A English Translation (Year: 2013).*

(Continued)

*Primary Examiner* — Anita Nassiri-Motlagh
(74) *Attorney, Agent, or Firm* — JCIPRNET (57) ABSTRACT

A zero-valent iron pillared montmorillonite repair material relates to the field of environmental functional materials. A preparation method thereof is mainly to obtain the zero-valent iron pillared montmorillonite repair material by reducing hydroxyl-iron pillared montmorillonite at high temperature in a mixed atmosphere of hydrogen and nitrogen, and mainly includes: (1) preparation of Na-montmorillonite; (2) preparation of a polyhydroxy-iron pillared solution; (3) preparation of hydroxy-iron pillared montmorillonite; and (4) obtaining the zero-valent iron pillared montmorillonite repair material by means of high-temperature reduction-calcination in the mixed atmosphere of hydrogen and nitrogen. The zero-valent iron pillared montmorillonite repair material can be used for removing degradation-resistant organic pollutants, and degrading organics into small molecular organics by means of peroxymonosulfate (PMS).

10 Claims, 11 Drawing Sheets

(51) Int. Cl.
*B01J 37/16* (2006.01)
*C02F 1/72* (2006.01)
*C02F 101/36* (2006.01)

(56) References Cited

FOREIGN PATENT DOCUMENTS

| CN | 104449748 | 3/2015 |
|---|---|---|
| CN | 105081305 | 11/2015 |
| CN | 106944054 | 7/2017 |
| CN | 106964311 | 7/2017 |
| EP | 2502671 | 9/2012 |

OTHER PUBLICATIONS

"International Search Report (Form PCT/ISA/210) of PCT/CN2017/112450," dated Feb. 28, 2018, with English translation thereof, pp. 1-4.

\* cited by examiner

ZERO-VALENT IRON PILLARED MONTMORILLONITE REPAIR MATERIAL, AND PREPARATION METHOD THEREFOR AND APPLICATION THEREOF

CROSS-REFERENCE TO RELATED APPLICATION

This application is a 371 of international application of PCT application serial no. PCT/CN2017/112450, filed on Nov. 23, 2017, which claims priority to and the benefit of China Patent Application No. 201710155827.3, filed on Mar. 16, 2017. The entirety of each of the above-mentioned patent applications is hereby incorporated by reference herein and made a part of this specification.

TECHNICAL FIELD

The present invention belongs to the field of environmental functional materials, and more particularly, relates to a zero-valent iron pillared montmorillonite repair material, and a preparation method and an application thereof.

BACKGROUND

Brominated flame retardants (BFRs), as the most widely consumed organic flame retardant in the world, are widely used in inflammables such as plastics, textiles and circuit boards to reduce the flammability thereof. The BFRs mainly include tetrabromobisphenol A (TBBPA), polybrominated diphenyl ethers (PBDEs), polybrominated biphenyls (PBBs) and hexabromocyclododecane (HBCD). TBBPA is the most widely used brominated flame retardant due to its good flame retardancy and simple synthesis process, accounting for 59% of the usage in the world and even as high as 76% in Asia. TBBPA has the properties of lipophilicity, bioaccumulation, persistence and long-range atmospheric mobility, and has been detected in the atmosphere, water body, soil, aquatic organism, human blood and breast milk, and even in polar bears far away from the places of origin and use. TBBPA has a structure similar to thyroxine, also has immune toxicity, thyroid interference effect, estrogen interference effect, etc., and is a potential endocrine disruptor. The negative impacts of which on people's living environment and physical health have attracted worldwide attention.

According to different principles of actions of degrading TBBPA, TBBPA degrading technologies mainly include microbial degrading technologies, physical methods and chemical degrading technologies. Regarding oxidative degrading technologies of TBBPA, mainly include Fenton-like oxidation, photocatalytic oxidation, catalyzed sulfate radical oxidation, metal oxide oxidation and joint technologies of intercombination of the foregoing methods. At present, degrading organic pollutants with sulfate radicals generated by persulfate activation is becoming a novel advanced oxidation technology. The persulfate is relatively stable, has a slow reaction rate at a normal temperature, and has a poor degrading effect on the organics. However, under the conditions of heat, light and transition metal ions, persulfate ions are activated and decomposed to produce strong oxidizing $SO_4^-$, which is widely used in the treatment of organic pollutants in wastewater, groundwater and soil. Peroxymonosulfate mainly exists in the form of a trisalt compound of $2KHSO_5 \cdot KHSO_4 \cdot K_2SO_4$, with a trade name of Oxone, which is an acid peroxide oxidant with wide applications and friendly environment feature.

Montmorillonite is a 2:1-type layered silicate mineral, and a three-dimensional structure thereof is a silica tetrahedron framework. Natural montmorillonite mainly exists in the forms of Na-montmorillonite and Ca-montmorillonite. The montmorillonite is formed in nature, which is mainly formed by weathering a basic igneous tuff in natural environment, and is a substance produced after decomposition of volcanic ash; moreover, the constituent parts of three minerals including bentonite, bentonite clay and bleaching clay are also mostly montmorillonite. China has rich montmorillonite resources and large montmorillonite reserves. The montmorillonite is widely distributed in China, belongs to a kind of very cheap and easily available mineral, and is widely used in metallurgy, machinery, chemical industry, petroleum, environmental protection and other fields.

Nano zero-valent iron (nZVI) refers to $Fe^0$ particle with a particle size in a range of 1 to 100 nm. With the decrease of the particle size, a specific surface area and a surface activity of a nanoparticle are also increased rapidly. The nZVI has an active chemical property, a relatively large electronegativity, an electrode potential of −0.44 V, and a strong reduction capability which can reduce various heavy metal pollutants. The nZVI has electrochemical properties, and also has a micro-electrolysis effect. During oxidation, the nZVI can produce flocculent precipitates (ferric hydroxide, ferrous hydroxide, etc.). In addition, the nano zero-valent iron also has a coagulation adsorption effect. As a fast, efficient and low-cost repair material, the nZVI has been widely used in the fields like drinking water treatment, and contaminated soil and groundwater repair, and can treat a variety of organic pollutants and heavy metal pollutions.

In past studies, a chemical reduction method (sodium borohydride) is mostly used in the method of modifying the montmorillonite with the zero-valent iron (ZVI) to prepare ZVI particles, thus widening the application of the montmorillonite in the field of environmental pollution repair. Meanwhile, the application of the ZVI-modified montmorillonite mainly focuses on adsorption treatment of wastewater polluted by heavy metal and reduction degradation of organic pollutants, while there are very few reports on using the ZVI as a catalyst to activate the persulfate to remove degradation-resistant organics. Based on the strong reduction capability of the ZVI and the strong oxidation capability of the sulfate radicals, the ZVI pillared montmorillonite composite material can be used as a high-efficiency catalyst to activate the peroxymonosulfate to generate sulfate radicals, so as to realize the purposes of synchronous reduction and oxidative degradation of the degradation-resistant organic pollutants. The development and application of the ZVI pillared montmorillonite technology have great practical significance for the treatment of the wastewater from the degradation-resistant organic pollutants.

SUMMARY

An object of the present invention is to provide a preparation method of a zero-valent iron pillared montmorillonite repair material.

Another object of the present invention is to provide a zero-valent iron pillared montmorillonite repair material prepared according to the preparation method above and a method of applying the zero-valent iron pillared montmorillonite repair material to efficiently activate peroxymonosulfate (PMS) for removing degradation-resistant organics.

The objects of the present invention are achieved through the following technical solutions.

A preparation method of a zero-valent iron pillared montmorillonite repair material includes the following steps:

(1) dispersing montmorillonite in a NaCl solution, stirring a mixture of the montmorillonite and the NaCl solution in a constant temperature water bath, standing and centrifuging the mixture; repeating the steps of dispersing, water bath stirring, standing and centrifuging, and then washing and drying the mixture to obtain Na-montmorillonite;

(2) dropping a $Na_2CO_3$ solution into a $FeCl_3$ solution, and continuously stirring and aging a reddish brown translucent pillaring solution obtained to obtain a polyhydroxy-iron pillaring solution;

(3) adding the Na-montmorillonite obtained in step (1) into water to prepare a Na-montmorillonite slurry, dripping the polyhydroxy-iron pillaring solution into the Na-montmorillonite slurry, then stirring, aging, centrifuging, washing, drying and sieving a mixture of the polyhydroxy-iron pillaring solution and the Na-montmorillonite slurry to obtain a hydroxyl-iron pillared montmorillonite; and (4) performing a high-temperature reduction on the hydroxyl-iron pillared montmorillonite obtained in step (3) in a mixed atmosphere of hydrogen and nitrogen to obtain the zero-valent iron pillared montmorillonite repair material.

Preferably, the montmorillonite in step (1) is purified Ca-montmorillonite; a concentration of the NaCl solution is 0.05 M to 0.15 M, more preferably 0.1 M; a temperature of the constant temperature water bath is 50° C. to 70° C.; and a number of times of the repeating steps is 2 to 4.

Preferably, a molar ratio of the $Na_2CO_3$ to the $FeCl_3$ in step (2) is 0.5:1 to 1.5:1, which is further preferably 1:1.

Preferably, a ratio of the hydroxyl-iron/Na-montmorillonite in step (3) is 5 mmol/g to 10 mmol/g, which is further preferably 10 mmol/g.

Preferably, the stirring in steps (2) and (3) lasts 1 hour to 3 hours, and the aging lasts 12 hours to 48 hours.

Preferably, a volume ratio of the hydrogen and the nitrogen in the mixed atmosphere in step (4) is 10:90 to 90:7; a condition for the high-temperature reduction is to calcine for 2 hours to 4 hours at a temperature increased to 200° C. to 1000° C. from a room temperature at a heating rate of 5° C./min to 10° C./min.

A zero-valent iron pillared montmorillonite repair material is obtained by the preparation method above.

The zero-valent iron pillared montmorillonite repair material above is applied in activating peroxymonosulfate for removing degradation-resistant organic pollutants, and the application includes the following steps:

(1) preparing a 10 mg/L to 30 mg/L organic pollutant solution; and (2) sequentially adding the zero-valent iron pillared montmorillonite repair material and the peroxymonosulfate into the organic pollutant solution, and activating the peroxymonosulfate with the zero-valent iron pillared montmorillonite to remove the degradation-resistant organic pollutants.

Preferably, the organic pollutant solution in step (1) is a tetrabromobisphenol A solution (TBBPA).

Preferably, a dosage of the zero-valent iron pillared montmorillonite in step (2) is 0.02 g/L to 0.5 g/L; and a dosage of the peroxymonosulfate is 0.05 mM to 0.5 mM.

Preferably, a preparation method and an application of a zero-valent iron pillared montmorillonite repair material include the following steps:

First step: sodium modification of Ca-montmorillonite: dispersing Ca-montmorillonite in a 0.1 M NaCl solution, fully stirring a mixture for 1 hour to 3 hours in a constant temperature water bath at 60° C., standing the mixture for 1 hour to 3 hours, repeating the steps for three times, placing a sodium-modified product in a centrifuge for centrifuging, discarding a supernatant, washing the sodium-modified product with distilled water for 4 to 6 times, finally drying the sodium-modified product at 50° C. u 70° C., and grinding and sieving the sodium-modified product with a 200-mesh sieve to obtain the Na-montmorillonite;

Second step: preparation of polyhydroxy-iron pillaring solution: dripping a 0.05 M to 0.15 M $Na_2CO_3$ solution into a 0.05 M to 0.15 M $FeCl_3$ solution through a constant pressure funnel according to a molar ratio of $Na_2CO_3/FeCl_3$ (0.5:1 to 1.5:1) under high-speed stirring, and continuously stirring a reddish brown translucent pillaring solution obtained for 1 hour to 3 hours and then aging the reddish brown translucent pillaring solution for 12 hours to 48 hours to obtain a polyhydroxy-iron pillaring solution, wherein the preferred molar ratio of $Na_2CO_3/FeCl_3$ is 1:1;

Third step: preparation of hydroxyl-iron pillared montmorillonite: preparing the Na-montmorillonite prepared in the first step into slurry with a mass fraction of 0.5% to 1% according to a certain hydroxyl-iron/montmorillonite ratio (5 mmol/g to 10 mmol/g) under high-speed stirring, slowly dripping the pillaring solution prepared in the second step into the slurry above, continuously stirring a mixture for 1 hour to 3 hours after being completely titrated, then aging the mixture for 12 hours to 48 hours, placing a pillared product in a centrifuge for centrifuging, discarding a supernatant, then washing the pillared product with distilled water for 4 to 6 times, finally drying the pillared product at 50° C. to 70° C., and grinding and sieving the pillared product with a 200-mesh sieve to obtain hydroxyl-iron pillared montmorillonite;

Fourth step: preparation of zero-valent iron pillared montmorillonite: heating the product obtained in the third step to 200° C. to 1000° C. for high-temperature reduction in a mixed atmosphere of hydrogen and nitrogen with different ratios (a volume ratio of the hydrogen and the nitrogen is 10:90 to 70:30), then grinding and sieving the product after the high-temperature reduction and calcination to obtain zero-valent iron pillared montmorillonite; and Fifth step: PMS activated by the zero-valent iron pillared montmorillonite to remove degradation-resistant organics: using the zero-valent iron pillared montmorillonite obtained in the fourth step as a catalyst to activate the PMS to remove a degradation-resistant organics (TBBPA), and adding a certain amount (0.02 g/L to 0.5 g/L) of the zero-valent iron pillared montmorillonite and a certain amount (0.05 mM to 0.5 mM) of oxidant (PMS) into a TBBPA solution with a certain concentration (5 mg/L to 30 mg/L) to react for a period of time to achieve the purpose of removing the degradation-resistant TBBPA in the solution.

Compared with the prior art, the present invention has the following advantages and technical effects.

The zero-valent iron pillared montmorillonite prepared according to the present invention can be applied for removing degradation-resistant organic pollutants, and degrading the organics into small molecular organics by means of the peroxymonosulfate.

DETAILED DESCRIPTION

The present invention is further described in detail below with reference to the embodiments and the drawings, which does not limit the implementation mode of the present invention.

First Embodiment

A method for preparing a zero-valent iron pillared montmorillonite repair material includes the following steps:

First step: 10 g of Ca-montmorillonite was dispersed in 200 ml of 0.1 M NaCl solution, fully stirred for 2 hours in a constant temperature water bath at 60° C., and stood for 2 hours; then a sodium-modified product was placed in a centrifuge for centrifuging, and a supernatant was discarded; then 100 ml of 0.1 M NaCl solution was added and fully stirred for 2 hours in the constant temperature water bath at 60° C., and stood for 2 hours; then a sodium-modified product was placed in the centrifuge for centrifuging, and a supernatant was discarded; then 50 ml of 0.1 M NaCl solution was added and fully stirred for 2 hours in the constant temperature water bath at 60° C., and stood for 24 hours; then a sodium-modified product was placed in the centrifuge for centrifuging, and a supernatant was discarded; then the sodium-modified product was washed with distilled water for 5 times, and finally dried at 60° C., and grinded and sieved with a 200-mesh sieve to obtain the Na-montmorillonite.

Second step: 200 mL of 0.1 M $Na_2CO_3$ solution was dripped into 200 ml of 0.1 M $FeCl_3$ solution through a constant pressure funnel according to a molar ratio of $Na_2CO_3/FeCl_3$ of 1:1 under high-speed stirring at 4000 rpm, and a reddish brown translucent pillaring solution was continuously stirred for 2 hours and then aged for 24 hours to obtain 400 mL of polyhydroxy-iron pillaring solution.

Third step: according to an optimal hydroxyl-iron/montmorillonite ratio of 10 mmol/g, 2 g of Na-montmorillonite prepared in the first step was accurately added into 100 mL of deionized water to prepare slurry with a mass fraction of 1%, then the pillaring solution prepared in the second step was dripped into the slurry, continuously stirred for 2 hours after being completely titrated, and then aged for 24 hours; a pillared product was placed in the centrifuge for centrifuging, and a supernatant was discarded; then the pillared product was washed with distilled water for 5 times, and finally dried at 60° C., and grinded and sieved with the 200-mesh sieve to obtain hydroxyl-iron pillared montmorillonite.

Fourth step: the product obtained in the third step was heated to 700° C. for thermal reduction for 3 hours at a heating rate of 5 min/° C. in a mixed atmosphere of hydrogen and nitrogen with a volume ratio of 50:50 (total ventilation flow rate of 100 $cm^3$/min), then the product after thermal reduction was grinded and sieved to obtain a zero-valent iron pillared montmorillonite repair material.

Figure 1:
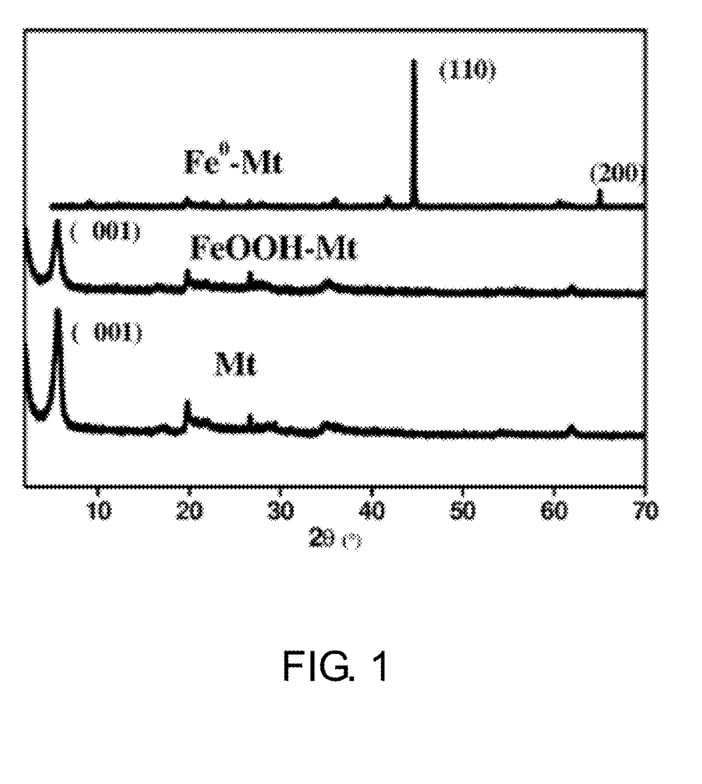
FIG. 1 is an XRD diagram of montmorillonite, hydroxyl-iron pillared montmorillonite and a zero-valent iron pillared montmorillonite repair material prepared in a first embodiment.
Figure 2:
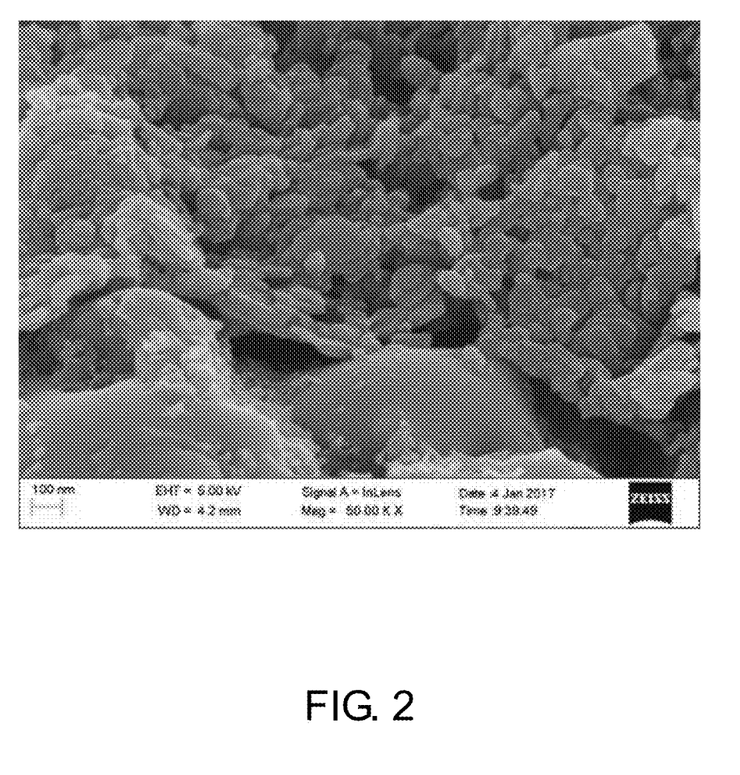
FIG. 2 is an SEM diagram of the zero-valent iron pillared montmorillonite repair material prepared in the first embodiment.
Figure 3:
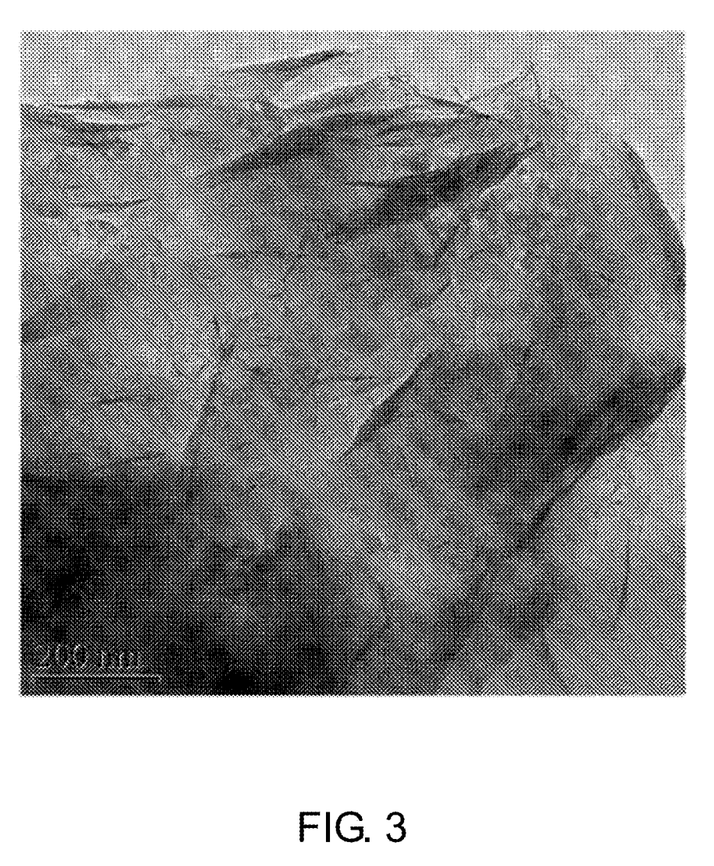
FIG. 3 is a TEM diagram of the zero-valent iron pillared montmorillonite repair material prepared in the first embodiment.
Figure 4:
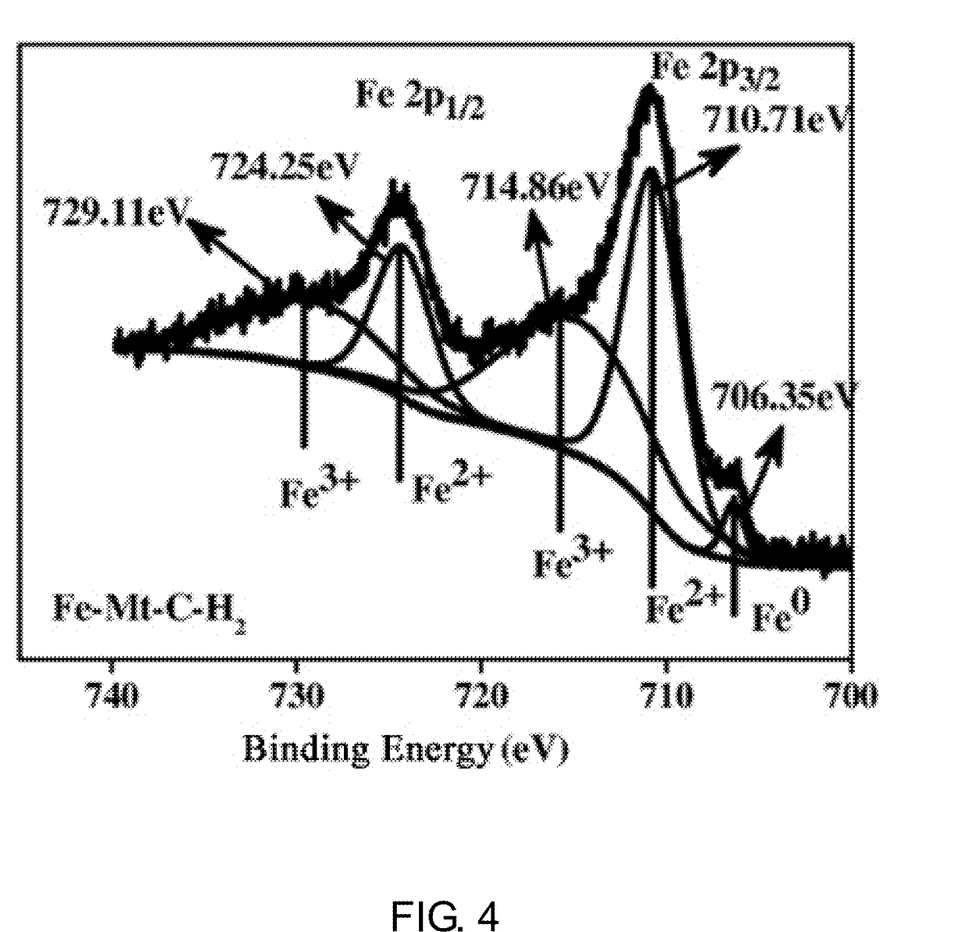
FIG. 4 is an XPS diagram of the zero-valent iron pillared montmorillonite repair material prepared in the first embodiment.

An X-ray Diffraction Diagram (XRD) of the zero-valent iron pillared montmorillonite repair material ($Fe^0$—Mt) prepared in the embodiment is shown in FIG. 1. Compared with the montmorillonite (Mt) and the hydroxyl-iron pillared montmorillonite (FeOOH—Mt), there are obvious characteristic peaks (110) and (200) of the zero-valent iron. An SEM diagram of the zero-valent iron pillared montmorillonite repair material ($Fe^0$—Mt) is shown in FIG. 2, and ellipsoidal zero-valent iron particles can be obviously seen between layers of the montmorillonite. A TEM diagram (FIG. 3) of the zero-valent iron pillared montmorillonite repair material ($Fe^0$—Mt) also fully illustrates this conclusion. A high-resolution XPS diagram of the zero-valent iron pillared montmorillonite repair material ($Fe^0$—Mt) Fe 2p is shown in FIG. 4, and a peak at a binding energy 706.35 eV illustrates the presence of the zero-valent iron particle in a final product again.

Second Embodiment

A zero-valent iron pillared montmorillonite repair material prepared in the first embodiment is applied to efficiently activate peroxymonosulfate (PMS) to remove degradation-resistant organics, which includes the following steps:

First step: 0.4 g of NaOH and 0.4 g of TBBPA were accurately added into a 100 ml volumetric flask in sequence to prepare 4 g/L TBBPA stock solution with water added, and 5 mL of 4 g/L TBBPA stock solution was accurately measured and added into a 2000 mL volumetric flask and diluted into a 10 mg/L TBBPA solution.

Figure 5:
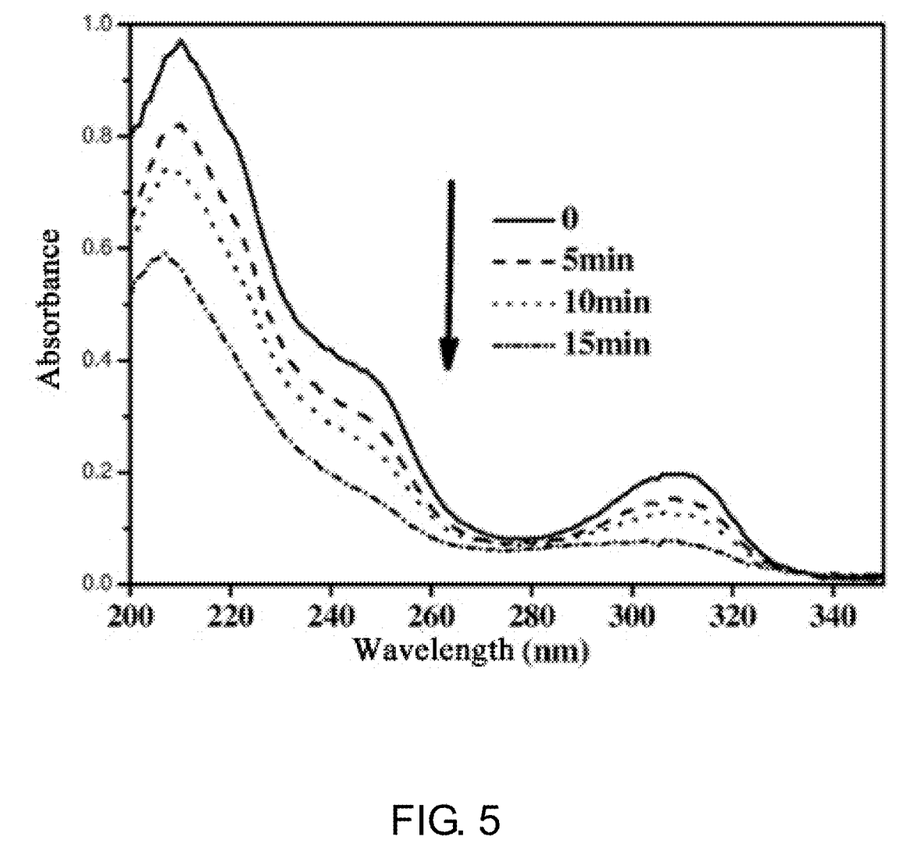
FIG. 5 is a UV-vis spectrum of degrading TBBPA via PMS activated by the zero-valent iron pillared montmorillonite repair material within different periods of time in a second embodiment.

Second step: 250 ml of 10 mg/L TBBPA solution was added into a 500 mL beaker, then 0.0154 g of PMS and 0.0125 g of $Fe^0$—Mt were accurately measured and added into the 500 mL beaker in sequence, 5 ml of TBBPA solution in the beaker was extracted by a syringe every 5 minutes, and a UV-vis spectrum of TBBPA in the solution was measured by an ultraviolet spectrophotometer; the relevant results were shown in FIG. 5, and the TBBPA could be completely degraded within 15 minutes.

Figure 6:
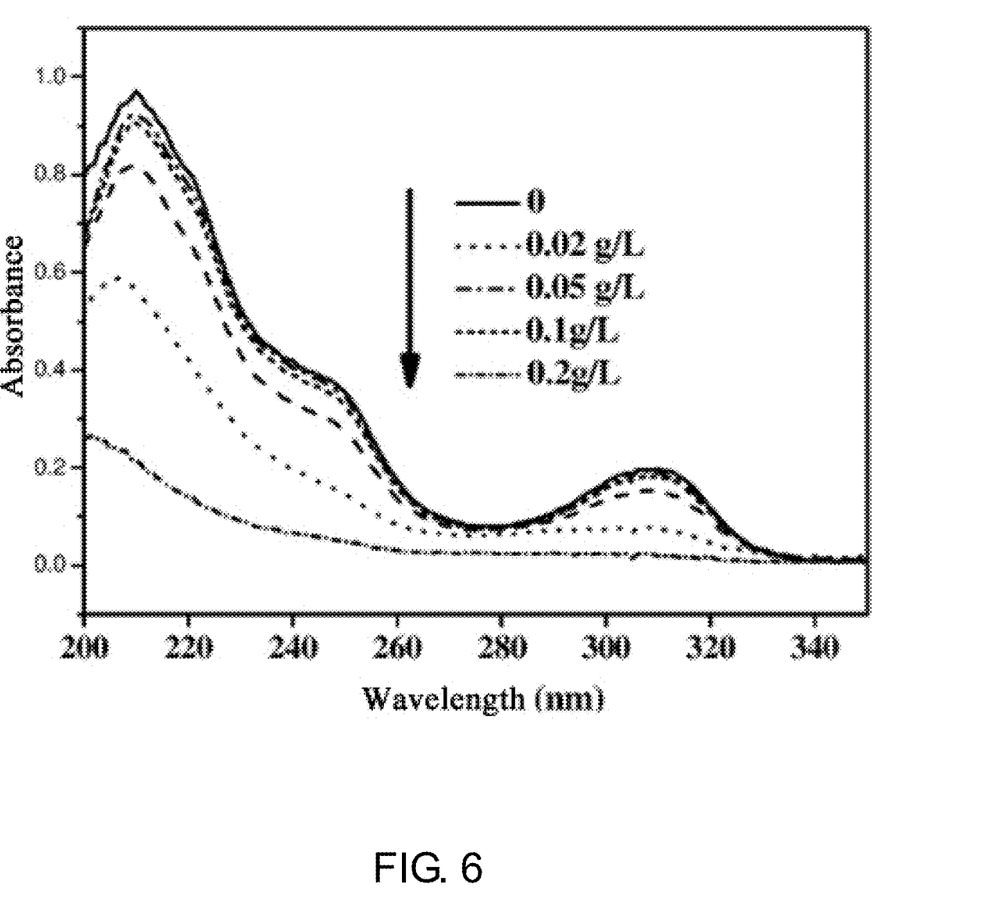
FIG. 6 is a UV-vis spectrum of degrading TBBPA via the PMS activated by the zero-valent iron pillared montmorillonite under different dosages of the zero-valent iron pillared montmorillonite repair material in the second embodiment.

Third step: four parts of 250 mL of 10 mg/L TBBPA solution were respectively added into four 500 mL beakers. Four parts of 0.0154 g of PMS were accurately added into 250 mL of TBBPA solution. 0.005 g, 0.0125 g, 0.025 g and 0.05 g of $Fe^0$—Mt were respectively and accurately added into 250 ml of TBBPA solution. 5 ml of TBBPA solution in each beaker was extracted by a syringe after reacting for 10 minutes, and the UV-vis spectrum of TBBPA in the solution was measured by a ultraviolet spectrophotometer; the relevant results were shown in FIG. 6, and it could be seen from FIG. 6 that the greater the dosage of $Fe^0$—Mt was, the faster the TBBPA degrading was and the better the effect was.

Figure 7:
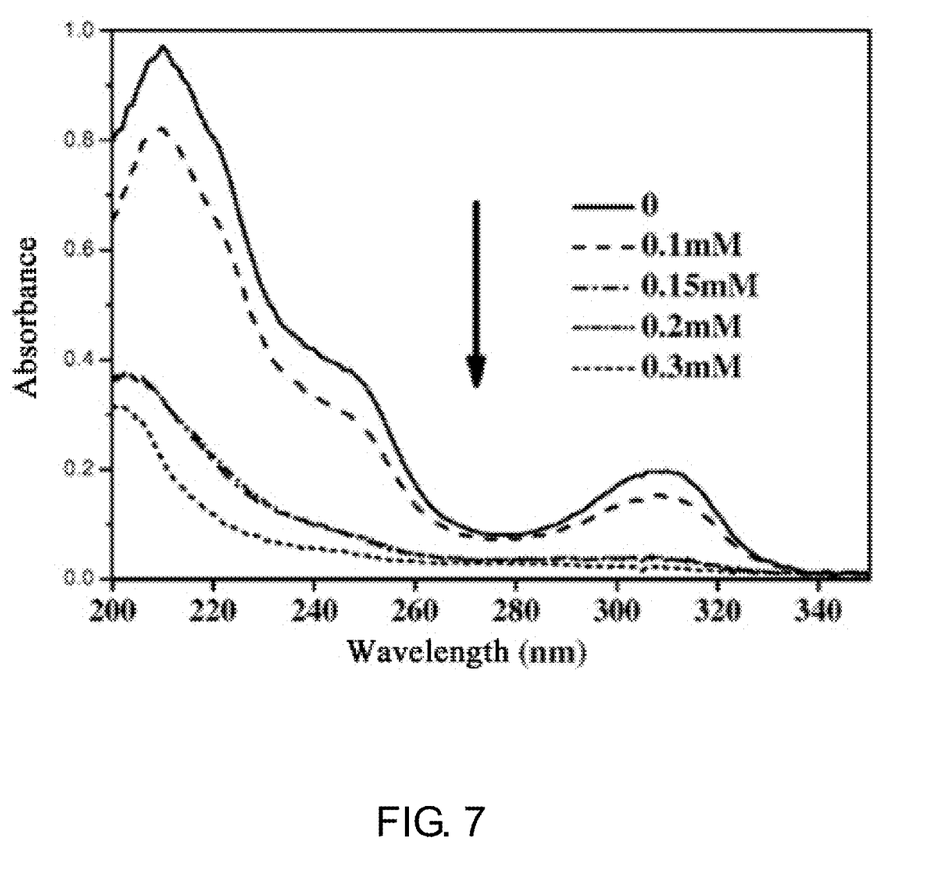
FIG. 7 is a UV-vis spectrum of degrading TBBPA via the PMS activated by the zero-valent iron pillared montmorillonite under different dosages of the PMS in the second embodiment.

Fourth step: four parts of 250 mL of 10 mg/L TBBPA solution were respectively added into four 500 mL beakers. Four parts of 0.0125 g of $Fe^0$—Mt were accurately added into 250 mL of TBBPA solution, 0.0077 g. 0.0115 g, 0.0154 g and 0.0231 g of PMS were respectively and accurately added into 250 ml of TBBPA solution. 5 ml of TBBPA solution in each beaker was extracted by a syringe after reacting for 10 minutes, and the UV-vis spectrum of TBBPA in the solution was measured by the ultraviolet spectrophotometer; the relevant results were shown in FIG. 7, and it could be seen from FIG. 7 that the greater the dosage of PMS was, the faster the TBBPA degrading was and the better the effect was.

Third Embodiment

Figure 8:
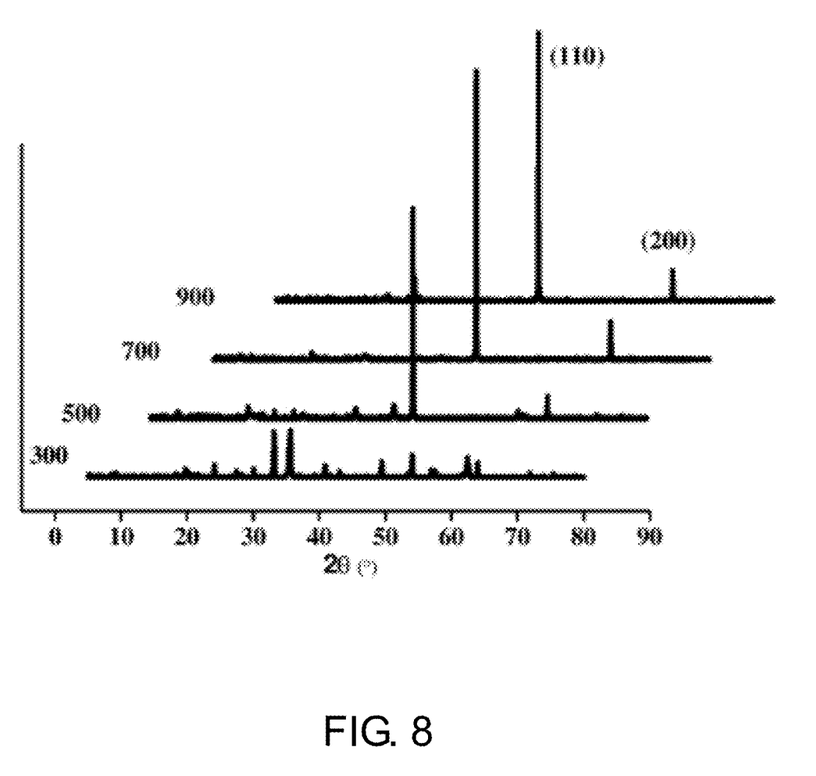
FIG. 8 is an XRD diagram of a zero-valent iron pillared montmorillonite repair material prepared at different calcination temperatures in a third embodiment.

First step: other steps were the same as those in the first embodiment, but in the fourth step, the hydroxyl-iron pillared montmorillonite was heated to 300° C., 500° C., 700° C. and 900° C. respectively for thermal reduction for 3 hours at a heating rate of 5° C./min in a mixed atmosphere of hydrogen and nitrogen with a volume ratio of 50:50. The reduced product was ground and sieved to obtain zero-valent iron pillared montmorillonite repair materials obtained by thermal reduction at different temperatures; and by comparing XRD spectrums of the zero-valent iron pillared montmorillonite repair materials obtained by thermal reduction at different temperatures (as shown in FIG. 8), the characteristic peaks (110) and (200) of the zero-valent iron could be observed.

Figure 9:
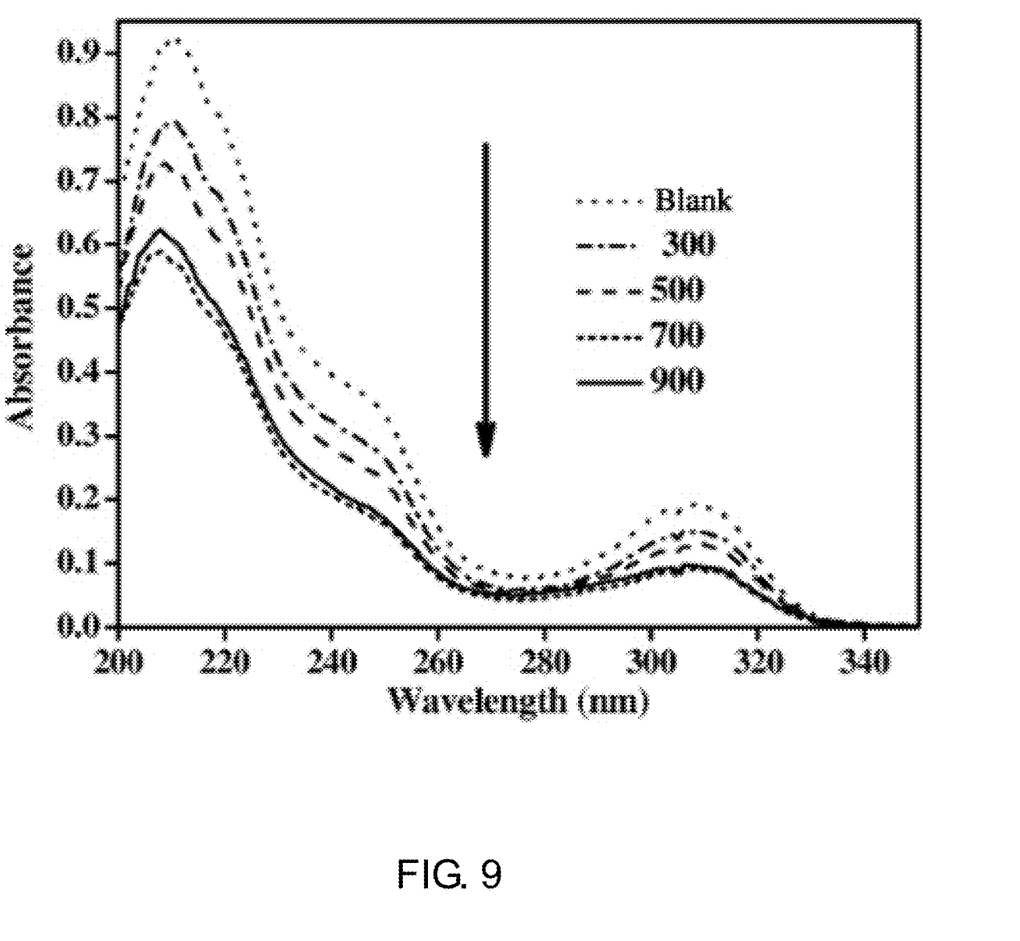
FIG. 9 is a UV-vis spectrum of degrading TBBPA via the PMS activated by the zero-valent iron pillared montmorillonite repair material prepared at different calcination temperatures in the third embodiment.

Second step: four parts of 250 mL of 10 mg/L TBBPA solution were respectively added into four 500 mL beakers, four parts of 0.0154 g of PMS were respectively and accurately added into 250 mL of TBBPA solution, and 0.0125 g of $Fe^0$—Mt obtained by thermal reduction at different temperatures (300° C., 500° C., 700° C. and 900° C.) were respectively and accurately added into 250 ml of TBBPA solution 5 ml of TBBPA solution in the beaker was extracted by a syringe after reacting for 10 minutes, and a UV-vis spectrum of TBBPA in the solution was measured by an ultraviolet spectrophotometer; the relevant results were shown in FIG. 9, and when the temperature was 900° C., the effect on degrading TBBPA via the PMS activated by the zero-valent iron pillared montmorillonite was the best.

Fourth Embodiment

Figure 10:
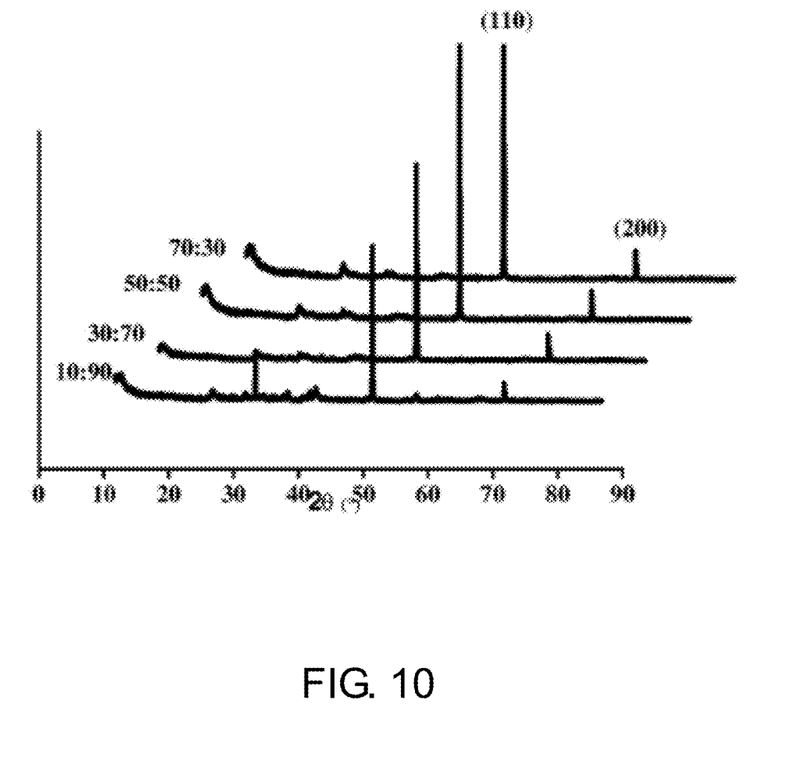
FIG. 10 is an XRD diagram of a zero-valent iron pillared montmorillonite repair material prepared under different hydrogen/nitrogen ratios in a fourth embodiment.

First step: other steps were the same as those in the first embodiment, but in the fourth step, the hydroxyl-iron pillared montmorillonite was heated to 700° C. for thermal reduction for 3 hours at a heating rate of 5° C./min in a mixed atmosphere of hydrogen and nitrogen with volume ratios of 10:90, 30:70, 50:50 and 70:30 respectively (total ventilation flow rate of 100 cm$^3$/min). The reduced product was ground and sieved to obtain zero-valent iron pillared montmorillonite products obtained by thermal reduction under different mixed atmospheres; and comparing XRD spectrums of the zero-valent iron pillared montmorillonite repair materials obtained by thermal reduction under different mixed atmospheres (as shown in FIG. 10), the characteristic peaks (110) and (200) of the zero-valent iron could be observed.

Figure 11:
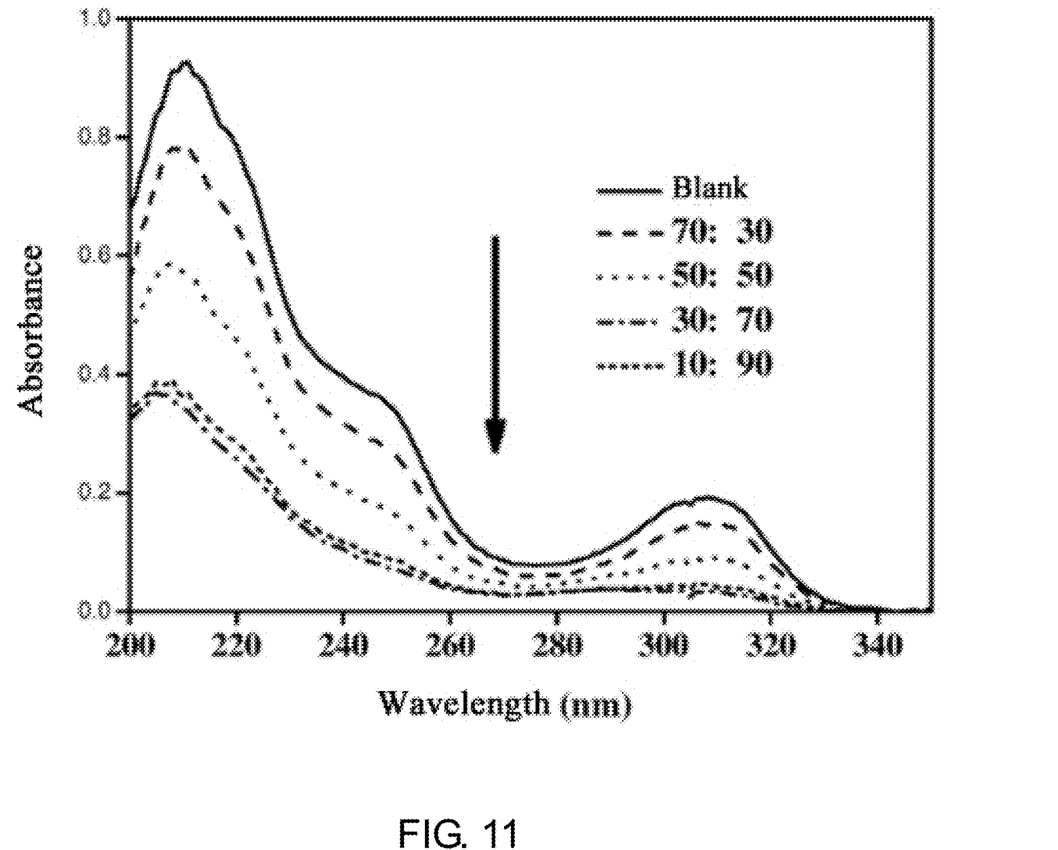
FIG. 11 is a UV-vis spectrum of degrading TBBPA via the PMS activated by the zero-valent iron pillared montmorillonite repair material prepared under different hydrogen/nitrogen ratios in the fourth embodiment.

Second step: four parts of 250 mL of 10 mg/L TBBPA solution were respectively added into four 500 mL beakers, four parts of 0.0154 g of PMS were accurately added into 250 mL of TBBPA solution, and 0.0125 g of $Fe^0$—Mt obtained by thermal reduction under different mixed atmospheres (10:90, 30:70, 50:50 and 70:30) were respectively and accurately added into 250 ml of TBBPA solution. 5 ml of TBBPA solution in the beaker was extracted by a syringe after reacting for 10 minutes, and a UV-vis spectrum of TBBPA in the solution was measured by an ultraviolet spectrophotometer; the relevant results were shown in FIG. 11, and when the volume ratio of hydrogen and nitrogen in the mixed atmosphere was 10:90, the effect on degrading TBBPA via the PMS activated by the zero-valent iron pillared montmorillonite was the best.

The embodiments above are the preferred implementations of the present invention, but the implementations of the present invention are not limited by the embodiments above. Any other amendment, modification, replacement, combination and simplification made without departing from the spiritual substance and principle of the present invention shall be equivalent substitute modes, and shall all fall within the scope of protection of the present invention.

What is claimed is:

1. A preparation method of a zero-valent iron pillared montmorillonite repair material, comprising the following steps:
   (1) dispersing montmorillonite in a NaCl solution, stirring a mixture of the montmorillonite and the NaCl solution in a constant temperature water bath, standing and centrifuging the mixture; repeating the steps of dispersing, water bath stirring, standing and centrifuging, and then washing and drying the mixture to obtain Na-montmorillonite;
   (2) dropping a $Na_2CO_3$ solution into an $FeCl_3$ solution, and continuously stirring and aging a reddish brown translucent pillaring solution obtained to obtain a polyhydroxy-iron pillaring solution;
   (3) adding the Na-montmorillonite obtained in step (1) into water to prepare a Na-montmorillonite slurry, dripping the polyhydroxy-iron pillaring solution into the Na-montmorillonite slung, then stirring, aging, centrifuging, washing, drying and sieving a mixture of the polyhydroxy-iron pillaring solution and the Na-montmorillonite slurry to obtain a hydroxyl-iron pillared montmorillonite; and
   (4) performing a high-temperature reduction on the hydroxyl-iron pillared montmorillonite obtained in step (3) in a mixed atmosphere of hydrogen and nitrogen to obtain the zero-valent iron pillared montmorillonite repair material.

2. The preparation method of the zero-valent iron pillared montmorillonite repair material according to claim 1, wherein the montmorillonite in step (1) is purified Ca-montmorillonite;
a concentration of the NaCl solution is 0.05 M to 0.15 M;
a temperature of the constant temperature water bath is 50° C. to 70° C.; and
a number of times of the repeating steps is 2~4.

3. The preparation method of the zero-valent iron pillared montmorillonite repair material according to claim 1, wherein a molar ratio of the $Na_2CO_3$ to the $FeCl_3$ in step (2) is 0.5:1~1.5:1.

4. The preparation method of the zero-valent iron pillared montmorillonite repair material according to claim 1, wherein a ratio of the hydroxyl-iron/Na-montmorillonite in step (3) is 5 mmol/g to 10 mmol/g.

5. The preparation method of the zero-valent iron pillared montmorillonite repair material according to claim 1, wherein the stirring in steps (2) and (3) lasts 1 hour to 3 hours, and the aging lasts 12 hours to 48 hours.

6. The preparation method of the zero-valent iron pillared montmorillonite repair material according to claim 1, wherein a volume ratio of the hydrogen and the nitrogen in the mixed atmosphere in step (4) is 10:90 to 90:7; and a condition for the high-temperature reduction is to calcine for 2 hours to 4 hours at a temperature increased to 200° C. to 1000° C. from a room temperature at a heating rate of 5° C./min to 10° C./min.

7. A zero-valent iron pillared montmorillonite repair material obtained by the preparation method according to claim 1.

8. An application of the zero-valent iron pillared montmorillonite repair material according to claim 7 in activating peroxymonosulfate for removing a degradation-resistant organic pollutant, comprising the following steps:
(1) preparing a 10 mg/L to 30 mg/L organic pollutant solution; and
(2) sequentially adding the zero-valent iron pillared montmorillonite repair material and the peroxyrnonosulfate into the organic pollutant solution, and activating the peroxymonosulfate with the zero-valent iron pillared montmorillonite to remove the degradation-resistant organic pollutant.

9. The application according to claim 8, wherein the organic pollutant solution in step (1) is a tetrabromobisphenol A solution.

10. The application according to claim 8, wherein a dosage of the zero-valent iron pillared montmorillonite repair material in step (2) is 0.02 g/L to 0.5 g/L; and a dosage of the peroxyrnonosulfate is 0.05 mM to 0.5 mM.

\* \* \* \* \*